US011473527B2

(12) United States Patent
Joel

(10) Patent No.: US 11,473,527 B2
(45) Date of Patent: Oct. 18, 2022

(54) NACELLE WITH TANGENTIAL RESTRAINT

(71) Applicant: The Boeing Company, Chicago, IL (US)

(72) Inventor: Jason F. Joel, Huntington Beach, CA (US)

(73) Assignee: The Boeing Company, Chicago, IL (US)

(*) Notice: Subject to any disclaimer, the term of this patent is extended or adjusted under 35 U.S.C. 154(b) by 246 days.

(21) Appl. No.: 16/820,611

(22) Filed: Mar. 16, 2020

(65) Prior Publication Data
US 2020/0284221 A1 Sep. 10, 2020

Related U.S. Application Data

(63) Continuation-in-part of application No. 15/279,024, filed on Sep. 28, 2016, now Pat. No. 10,589,868.

(51) Int. Cl.
F02K 1/72 (2006.01)
B64D 29/06 (2006.01)

(52) U.S. Cl.
CPC .............. F02K 1/72 (2013.01); B64D 29/06 (2013.01)

(58) Field of Classification Search
CPC . F02K 1/72; B64D 29/06; Y02T 50/60; F05D 2260/941
See application file for complete search history.

(56) References Cited

U.S. PATENT DOCUMENTS

| 4,658,579 | A | 4/1987 | Bower et al. |
| 5,239,811 | A | 8/1993 | Spearman |
| 8,727,275 | B2* | 5/2014 | Aten .................. F02K 1/82 239/31 |
| 8,887,511 | B2 | 11/2014 | Germain et al. |
| 9,188,025 | B2 | 11/2015 | Calder |
| 9,783,315 | B2* | 10/2017 | James .................. B64D 29/08 |
| 10,543,927 | B2* | 1/2020 | Lu ...................... B64C 7/02 |
| 10,570,854 | B2* | 2/2020 | Stone .................. F02K 3/02 |
| 11,131,270 | B2* | 9/2021 | Patsouris ............ F02K 1/72 |
| 2010/0001123 | A1* | 1/2010 | Hillereau .......... B64D 29/06 244/54 |
| 2014/0150403 | A1* | 6/2014 | Stuart ................ F02K 1/72 60/204 |
| 2014/0301835 | A1 | 10/2014 | Popescu et al. |
| 2015/0110613 | A1 | 4/2015 | Aten |
| 2015/0110619 | A1 | 4/2015 | Bulin et al. |
| 2018/0155042 | A1* | 6/2018 | LaBelle ............ F01D 25/28 |
| 2018/0362173 | A1 | 12/2018 | Delaney |
| 2019/0032377 | A1 | 1/2019 | Dyer |
| 2019/0055902 | A1* | 2/2019 | Stone ................ F02K 1/72 |

FOREIGN PATENT DOCUMENTS

EP 0744339 11/1996

* cited by examiner

Primary Examiner — Valentina Xavier
(74) Attorney, Agent, or Firm — Haynes and Boone, LLP

(57) ABSTRACT

Systems and methods are provided for an aircraft propulsor with a fan cowl with one or more tangential restraints. The tangential restraints may be configured to enter respective tangential receiving portions of a fixed portion of the aircraft propulsor. The fan cowl may receive a load that may include a bending load. The tangential restraints may be configured to convert the bending load to membrane tension and thus decrease deflection of the fan cowl. The fan cowl may be a translating sleeve used for a reverse thrust.

20 Claims, 11 Drawing Sheets

NACELLE WITH TANGENTIAL RESTRAINT

CROSS-REFERENCE TO RELATED APPLICATIONS

The present application is a continuation-in-part of U.S. patent application Ser. No. 15/279,024, filed Sep. 28, 2016, incorporated herein by reference.

BACKGROUND

The disclosure relates generally to aircraft and more specifically to aircraft propulsors and aircraft propulsor fan cowl structures.

Aircraft fan cowls may deflect under load, which may result in increased drag and fuel consumption. Conventionally, fan cowl material thickness is increased and/or additional ribbing structure is added to reduce such deflections. However, such solutions add weight to an aircraft and decrease efficiency.

SUMMARY

Systems and methods are disclosed herein for tangential restraints for fan cowls to reduce deflection. In one example, an aircraft propulsor may be provided. The aircraft propulsor may include a core engine, a fixed nacelle portion circumscribing the core engine and comprising a nacelle latch, and a fan cowl configured to rotate around at least a first axis. The fan cowl may include a fan cowl latch configured to couple to the nacelle latch, and a tangential restraint configured to convert at least a portion of a radial load received by the fan cowl to membrane tension by contacting a portion of the fixed nacelle portion when the fan cowl latch and the nacelle latch are coupled together.

In another example, a method may be provided. The method may include coupling a core engine to a fixed nacelle portion, wherein the fixed nacelle portion circumscribes the core engine; and coupling a fan cowl to a portion of the fixed nacelle portion such that the fan cowl is configured to rotate around at least a first axis. The fan cowl may include a fan cowl latch configured to couple to the nacelle latch, and a tangential restraint configured to transfer load to the fixed nacelle portion when the fan cowl latch and the nacelle latch are coupled together.

In another example, at least part of the nacelle or of the fan cowl may be a translating sleeve of a reverse thrust system. In forward thrust configuration, the translating sleeve is coupled to a fixed nacelle portion, and tangential restraints convert at least a portion of a radial load received by the translating sleeve to membrane tension as described above. In reverse thrust configuration, the translating sleeve moves away from the fixed nacelle portion. When the translating sleeve moves back to the forward thrust position, the tangential restraints enter the tangential receiving portions of the fixed nacelle portion to reduce the load on the translating sleeve if the translating sleeve deflects.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Systems and techniques for tangential restraints used in fan cowls of aircraft propulsor are described in the disclosure herein in accordance with one or more examples. The tangential restraints may be one or more components that may restrain a point and/or portion of the fan cowl and decrease deflection of the fan cowl. Such deflection may be from, for example, loads due to aerodynamic forces (e.g., from low pressure regions and/or scooping), structural loads (e.g., structural loads due to aircraft maneuvering), and/or operating loads (e.g., loads from operation of the aircraft propulsor) on the aircraft propulsor.

The tangential restraints may, for example, include pins, formed sheetmetal, latches, detents, other fasteners, cast inserts, molded inserts, and/or other such features to secure a portion of the fan cowl. Certain embodiments may include one or a plurality of such tangential restraints. The tangential restraints may be arranged in any manner that may reduce deflection of the fan cowl. For example, tangential restraints may be equally spaced or may be arranged in a manner that increases the concentration of tangential restraints in areas determined to be experiencing higher deflection. The tangential restraints may be configured to automatically engage when the fan cowl is in a closed configuration (e.g., shut so as to prevent access to components of the aircraft propulsor) and/or when the fan cowl experiences a force that may lead to deflection of the fan cowl greater than a threshold deflection amount (e.g., greater than 1 inch, less than 1 inch, less than 0.6 inches, less than 0.06 inches, or less than 0.03 inches).

Figure 1:
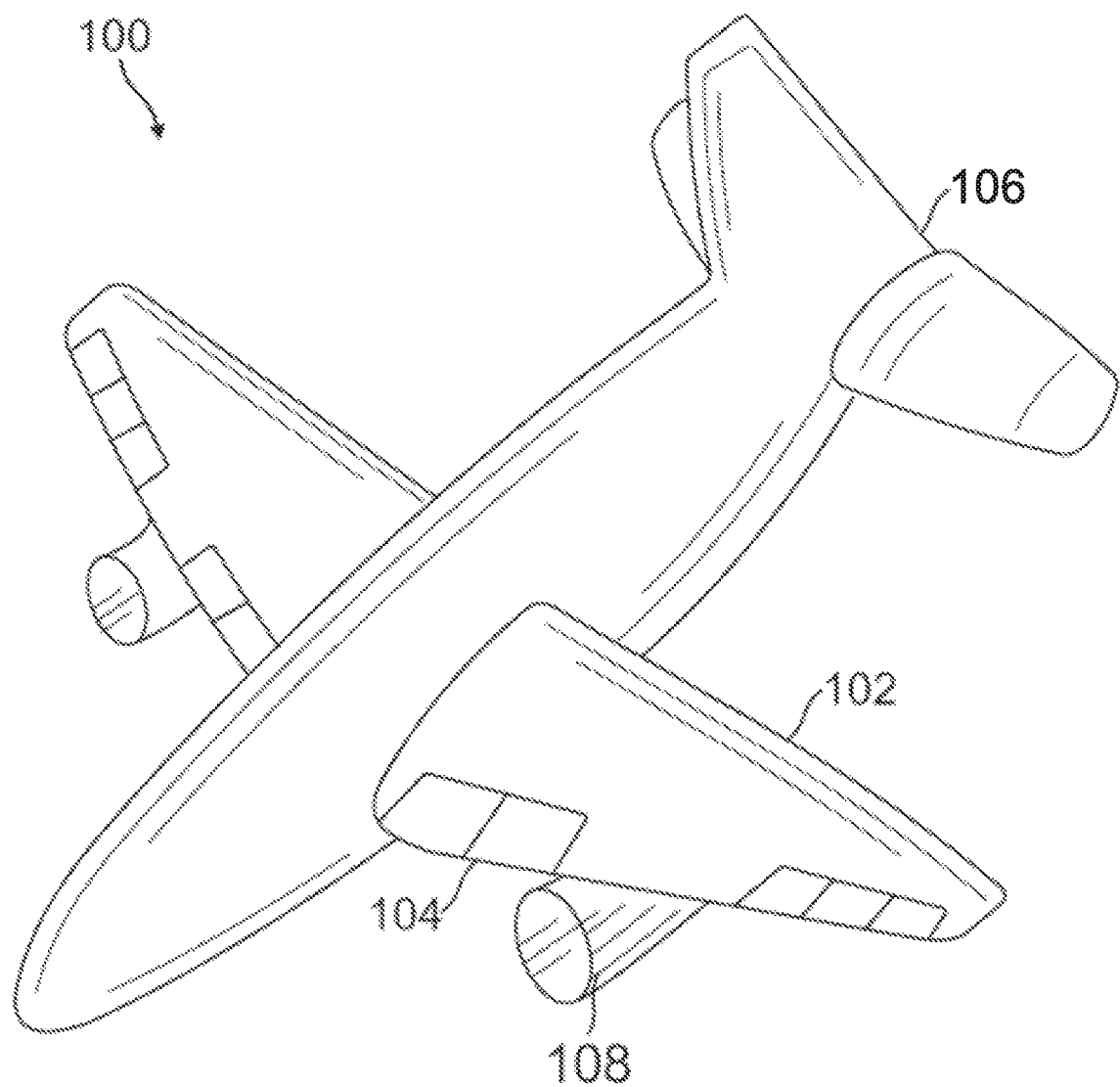
FIG. 1 illustrates a perspective view of an aircraft in accordance with an example of the disclosure.

FIG. 1 illustrates a perspective view of an aircraft in accordance with an example of the disclosure. In FIG. 1, aircraft 100 includes a main aerodynamic device 102, a secondary aerodynamic device 104, a fuselage 106, and a propulsor 108. Though the aircraft 100 shown in FIG. 1 may be a passenger airplane, other examples of the aircraft 100 may include any type of aircraft such as transport planes, helicopters, military aircraft, spacecraft, ground effects vehicles, and other such vehicles.

The propulsor 108 may be any type of aircraft engine. Non-limiting examples of such engines include turbofans, turboprops, and turbojets. In certain examples, the propulsor 108 may include one or more fan cowls. The fan cowls may, for example, be hinged or otherwise coupled to a body of propulsor 108 and may, thus, be able to open and close. Fan cowls may be shut and secured via one or more latches. In certain examples, the hinge may be located on one end of the fan cowl and at least one latch may be located on a portion of the fan cowl substantially opposite that of the location of the hinge. The fan cowl may be formed to substantially conform to an outside surface of the propulsor 108 in a manner configured to minimize drag from air flowing past propulsor 108. An aircraft 100 may have any number of propulsors 108.

The fuselage 106 may be any type of aircraft fuselage. The fuselage 106 may bear structural loads. For example, the fuselage 106 may bear loads from the structure of the aircraft 100 itself, load carried by the aircraft 100, the main aerodynamic device 102, secondary aerodynamic device 104, the propulsor 108, and/or other components of the aircraft 100.

The main aerodynamic device 102 may be any fixed portion of a component of the aircraft 100 that may directly or indirectly affect the handling of the aircraft 100. As such, non-limiting examples of the main aerodynamic device 102 may include a wing, as shown in FIG. 1, a tail, a horizontal stabilizer, and another such control surface. For the purposes of this disclosure, any component that may generate lift, drag, steering force, and/or other such aerodynamic forces may be considered an aerodynamic device. In FIG. 1, the main aerodynamic device 102 may be fixed to the fuselage 106 of the aircraft 100, but other examples may fix the main aerodynamic device 102 to other portions of the aircraft 100.

The secondary aerodynamic device 104 may move relative to the main aerodynamic device 102. As such, the secondary aerodynamic device 104 may be a slat, a flap, a droop nose, an aileron, a flaperon, an elevator, a rudder, a moveable spoiler, portions of a flexible wing, or another such moveable aerodynamic component. Examples of the aircraft 100 may include any number of secondary aerodynamic devices 104 per main aerodynamic device 102.

Figure 2:
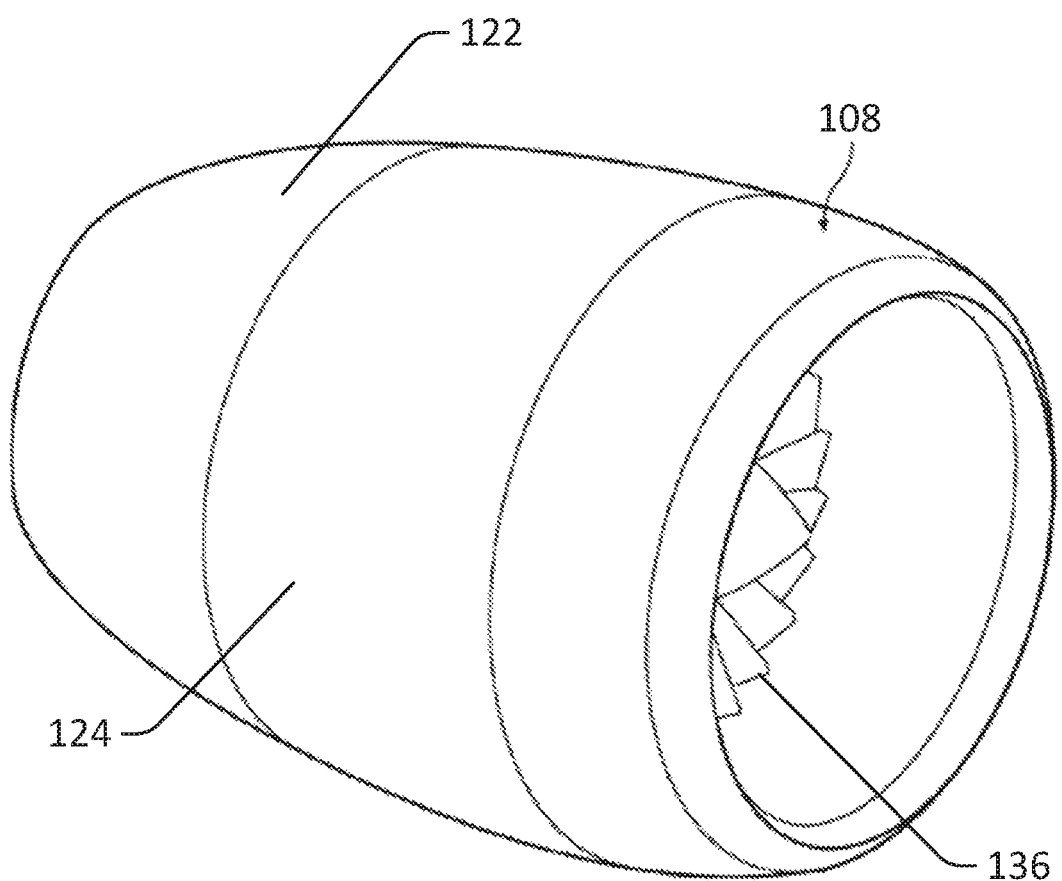
FIG. 2 illustrates a perspective view of an aircraft propulsor in accordance with an example of the disclosure.

FIG. 2 illustrates a perspective view of an aircraft propulsor 108 in accordance with an example of the disclosure. The aircraft propulsor 108 shown in FIG. 2 may include a core engine 136, a fan cowl 124, and a fixed nacelle portion 122. The fan cowl 124 may cover a portion of the core engine 136 and/or other portions of the aircraft propulsor 108.

The fixed nacelle portion 122 may be a portion of the aircraft propulsor 108 that is fixed relative to the core engine 136, fuselage 106, main aerodynamic device 102, and/or another portion of the aircraft 100 during normal operation (e.g., when the aircraft propuslor 108 is operating during flight of aircraft 100) of the aircraft propulsor 108. The fixed nacelle portion 122 in FIG. 2 may be shaped to allow air to smoothly flow over a surface of the fixed nacelle portion 122 (e.g., the outer portion of the fixed nacelle portion 122).

The fan cowl 124 may be coupled to the fixed nacelle portion 122 and/or another portion of the aircraft propulsor 108. The fan cowl 124 may, for example, be hinged to the fixed nacelle portion 122. The fan cowl 124 may rotate around the hinged portion. As such, the fan cowl 124 may, for example, be rotated upward, downward, and/or otherwise moved (e.g, translated) into an open position such that portions of the core engine 136 may be accessed. The fan cowl 124 may also be moved to a closed position to prevent access to the portions of the core engine 136. Certain examples may position the fan cowl 124 towards the back of the aircraft propulsor 108, towards the middle of the aircraft propulsor 108 (e.g., between two fixed nacelle portions as shown in FIG. 2), or towards the front of the aircraft propulsor 108. Certain other examples of the aircraft propulsor 108 may include any number of fan cowls, such as one, two, three, four, or five or more fan cowls.

In certain examples, the fan cowl 124 may be coupled to the fixed nacelle portion 122 by, for example, one or more mechanisms that connect the fan cowl 124 to the fixed nacelle portion 122 and/or another portion of the aircraft propulsor 108. The one or more mechanisms may allow fan cowl 124 to move relative to the fixed nacelle portion 122 when the fan cowl 124 is not locked to the fixed nacelle portion 122. The fan cowl 124 may be coupled by, for example, one or more latches, locking mechanisms, magnetic couplings, and/or other mechanisms that may hold at least a portion of the fan cowl 124 (e.g., the portion with the locking mechanism) in a fixed spatial relation to that of at least a portion of the fixed nacelle portion 122 and/or the portion of the aircraft propulsor 108.

Figure 3:
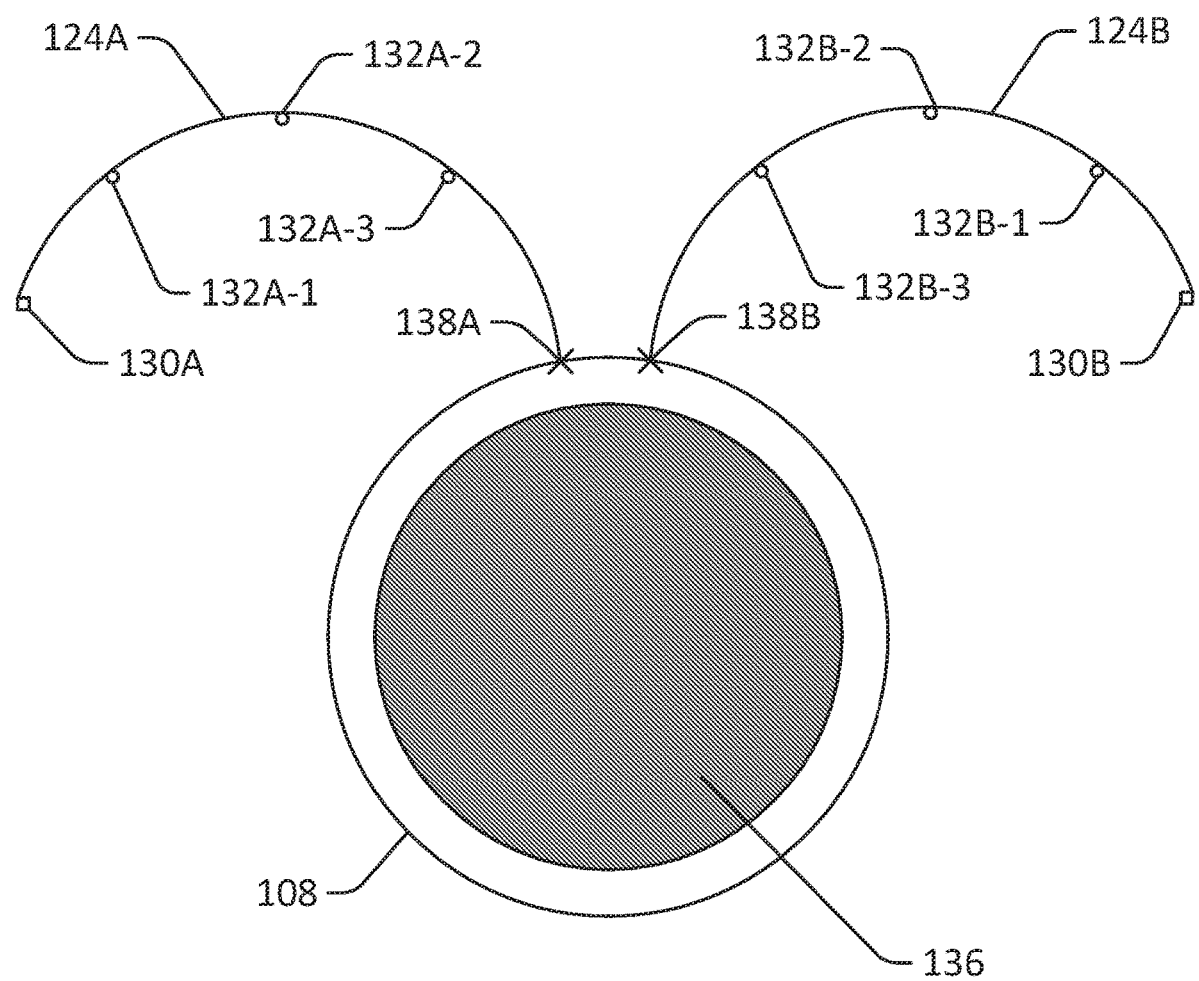
FIG. 3 illustrates a front view of an aircraft propulsor with open fan cowls in accordance with an example of the disclosure.

FIG. 3 illustrates a front view of an aircraft propulsor with open fan cowls in accordance with an example of the disclosure. FIG. 3 may include the aircraft propulsor 108 with the core engine 136 and fan cowls 124A and 124B. The fan cowls 124A and 124B may be coupled to a fixed portion of the aircraft propulsor 108 (e.g. a fixed nacelle portion 122) and may move relative to the fixed portion of the aircraft propulsor 108. For example, as shown in FIG. 3, the fan cowls 124A and 124B may rotated around rotational axes 138A and 138B, respectively.

The fan cowls 124A and 124B may include latches 130A and 130B, respectively. Latches 130A and 130B may, if engaged, lock the fan cowls 124A and 124B, respectively, to the fixed portion of the aircraft propulsor 108 (e.g., the fixed nacelle portion 122). Additionally, the fan cowl 124A may include tangential restraints 132A-1, 132A-2, and 132A-3. The fan cowl 124B may include tangential restraints 132B-1, 132B-2, and 132B-3.

The tangential restraints 132A-1 to 132A-3 and/or 132B-1 to 132B-3 may be any restraint that may allow for force to be transferred from the fan cowls 124A and/or 124B to the fixed nacelle portion 122 of the aircraft propulsor 108 and/or convert bending forces experienced by the fan cowls 124A and/or 124B to membrane tension. In certain examples, the tangential restraints 132A-1 to 132A-3 and/or 132B-1 to 132B-3 may decrease deflection of the fan cowls 124A and/or 124B from aerodynamic forces. For example, certain examples of the fan cowls 124A and/or 124B may be significantly stronger (e.g., result in less deflection per unit force) in membrane tension than in bending. Additionally, coupling the tangential restraints to the fixed nacelle portion 122 may stiffen the fan cowls 124A and/or 124B and/or transfer loads to the fixed nacelle portion 122 via the tangential restraints and thus further decrease deflection of the fan cowls 124A and/or 124B.

The tangential restraints 132A-1 to 132A-3 and/or 132B-1 to 132B-3 may include features that may contact the fixed nacelle portion of the aircraft propulsor 108 (or a portion thereof). In certain examples, the tangential restraints 132A-1 to 132A-3 and/or 132B-1 to 132B-3 may constrain movement of the fan cowls 124A and/or 124B in one or more directions. In certain such examples, certain tangential restraints 132A-1 to 132A-3 and/or 132B-1 to 132B-3 may, when subjected to a certain amount of defection (e.g., deflection of between 0 to 10 inches) contact the fixed nacelle portion of the aircraft propulsor 108 (or a portion thereof). Upon contact, the tangential restraints 132A-1 to 132A-3 and/or 132B-1 to 132B-3 may be prevented from substantially deflecting or substantially deflecting further, may transfer force received by the fan cowls 124A and/or 124B to the fixed nacelle portion of the aircraft propulsor 108, may stiffen the fan cowls 124A and/or 124B, and/or convert bending loads experienced by the fan cowls 124A and/or 124B to membrane tension.

Various examples of the tangential restraints 132A-1 to 132A-3 and/or 132B-1 to 132B-3 may include, for example, pins, formed sheetmetal, latches, detents, other fasteners, cast inserts, molded inserts, and/or other such features. The fixed nacelle portion of the aircraft propulsor 108 may include corresponding features to receive such tangential restraints 132A-1 to 132A-3 and/or 132B-1 to 132B-3. As such, the fixed nacelle portion may include a hole or slot to receive a pin tangential restraint, a concave feature to receive a convex shaped tangential restraint, a hook that may interface with the tangential restraint, and/or another such corresponding feature.

For examples with a plurality of tangential restraints, such as the tangential restraints 132A-1 to 132A-3 and/or 132B-1 to 132B-3, the tangential restraints may be spaced in a manner to decrease deflection of the fan cowls 124A and/or 124B relative to the fixed nacelle portion. In certain examples, such as that shown in FIG. 3, each fan cowl may include a plurality of tangential restraints. In certain such examples, the tangential restraints may be arranged in a regular manner around the fan cowl (e.g., a tangential restraint may be disposed on the fan cowl once every 45 degrees). In certain other examples, the tangential restraints may be arranged in a manner to effectively reduce deflection of the fan cowl (e.g., if a certain portion of the fan cowl, without tangential restraints, is experiencing a high amount of deflection, a higher number of tangential restraints may be added to that location while a portion of the fan cowl that may be experiencing low deflection may not include a large number of tangential restraints).

Figure 4:
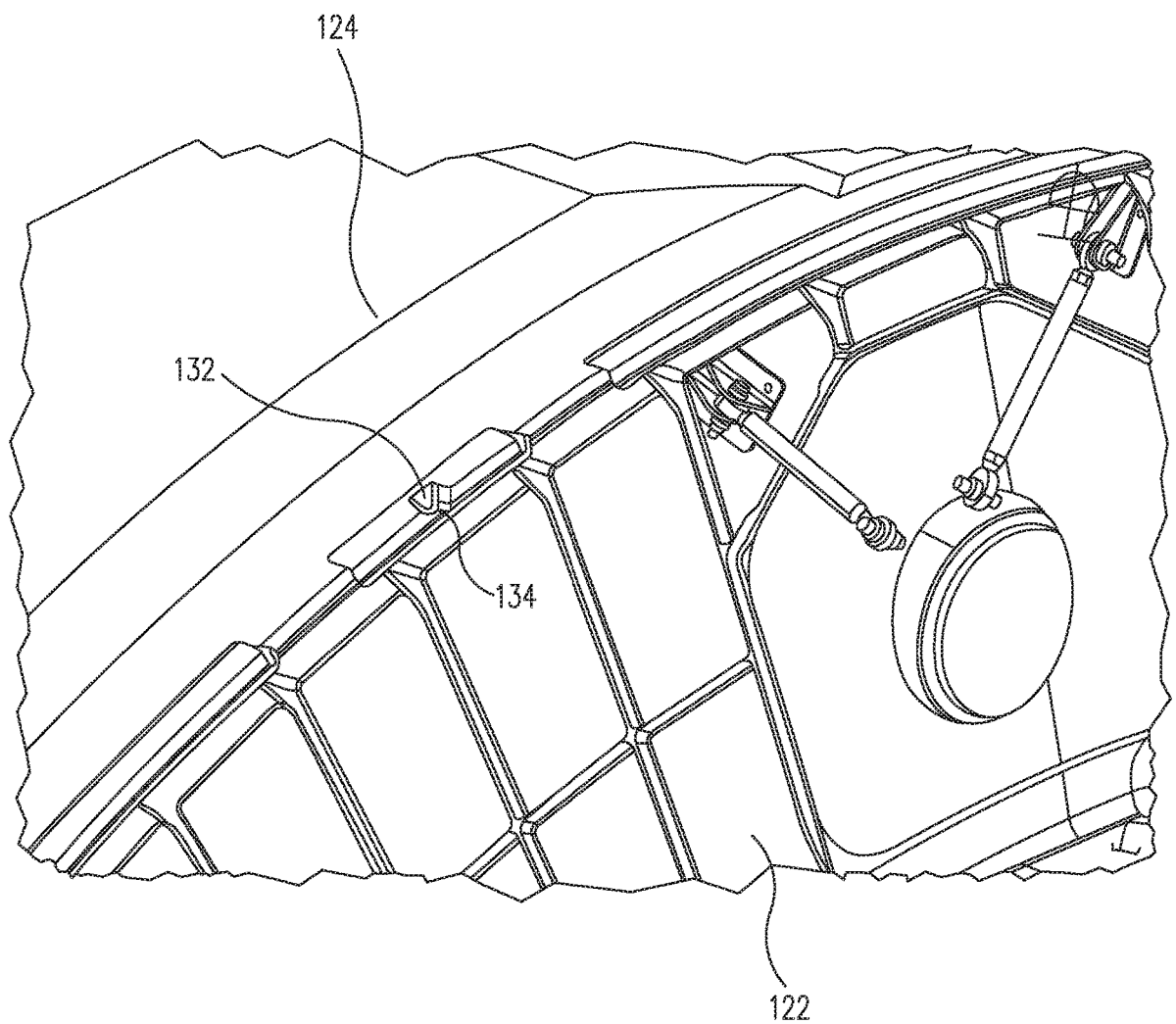
FIG. 4 illustrates a tangential restraint in accordance with an example of the disclosure.

FIG. 4 illustrates a tangential restraint in accordance with an example of the disclosure. FIG. 4 shows an inside portion of the aircraft propulsor 108. The aircraft propulsor 108 may include a fan cowl 124 with a tangential restraint 132 and a fixed nacelle portion 122 with a tangential receiving portion 134. The tangential receiving portion 134 may receive the tangential restraint 132 when the fan cowl 124 is shut. When the tangential restraint 132 is received by the tangential receiving portion 134, deflection of the fan cowl 124 may be reduced.

In certain examples, the tangential receiving portion 134 may include geometry that may receive a corresponding tangential restraint 132. In certain such examples, the tangential receiving portion 134 may be configured such that moving the fan cowl 124 (e.g., opening and/or shutting the fan cowl 124) may not result in contact between the tangential restraint 132 and the tangential receiving portion 134. In certain such examples, the tangential restraint 132 may, when the fan cowl 124 is in a closed (e.g., covering portions of the core engine 136) position and/or when subjected to a force, contact the tangential receiving portion 134. Also, certain examples of the tangential restraint 132 and/or the tangential receiving portion 134 may be coupled to the fan cowl 124 (e.g., the fixed nacelle portion 122) during normal operation and may be configured to decouple from the fan cowl 124 when subjected to a force from within the aircraft propulsor 108. Such a force may be, for example, a force associated with and/or similar to that experienced by the fan cowl 124 when the core engine 136 has a fan blade out. In certain situations, one or more fan blades of the core engine 136 may fail and may contact the fan cowl 124. In such a situation, the tangential receiving portion 134 and/or the tangential restraint 132 may deform and/or decouple in a manner that may decrease the likelihood of the fixed nacelle portion 122 from failing catastrophically (e.g., prevent catastrophic failure of the fixed nacelle portion 122 due to force from the fan blade out being transferred).

Figure 5A:
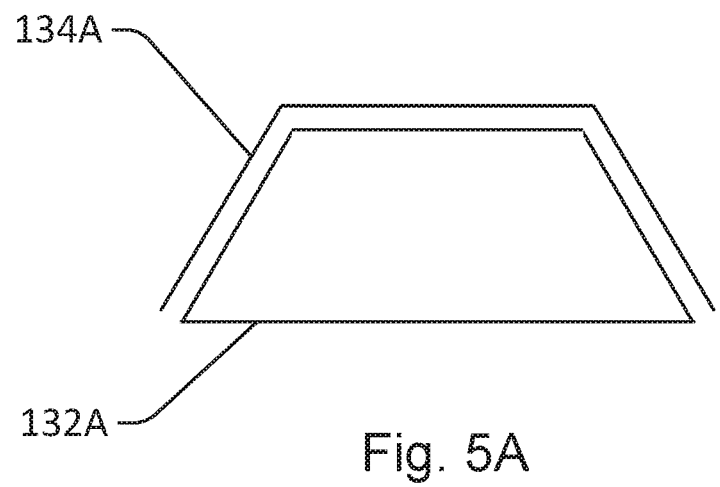
FIGS. 5A-C illustrate various tangential restraint configurations in accordance with examples of the disclosure.
Figure 5B:
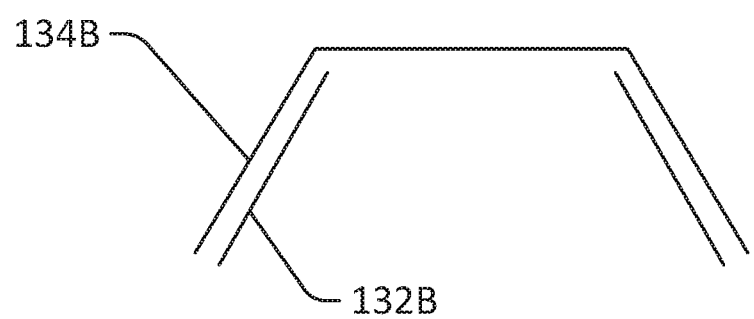
Figure 5C:
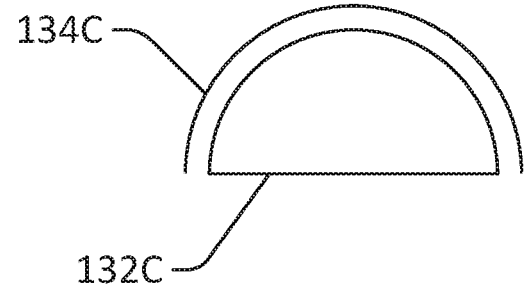

FIGS. 5A-C illustrate various tangential restraint configurations in accordance with an example of the disclosure. The tangential restraints illustrated in FIGS. 5A-C are for illustrative purposes only. Various other examples of tangential restraints may also be used.

FIG. 5A illustrates a tangential restraint 132A with a tangential receiving portion 134A. The tangential restraint 132A may be a trapezoid shape. The tangential restraint 132A may include one or more restraint surfaces (e.g., the non-parallel sides of the trapezoid) and the tangential receiving portion 134A may also include one or more features (e.g., surfaces) configured to interface with the one or more restraint surfaces (e.g., a fixed nacelle surface). In certain examples, the one or more restraint surfaces may be offset from the one or more features configured to interface with the one or more restraint surfaces (e.g., a distance of between 0 to 10 inches such as 0.03, 0.06, 0.1, 0.5, 1, and/or greater than 1 inches). Deflection of the fan cowl 124 may lead to contact between the one or more restraint surfaces with the one or more features configured to interface with the one or more restraint surfaces.

Due to such contact, bending of the fan cowl 124 may be converted (via contact between the one or more restraint surfaces with the one or more features configured to interface with the one or more restraint surfaces) to membrane tension of the fan cowl 124. The fan cowl 124 may, in certain example, be orders of magnitudes stiffer in membrane tension than bending. As such, deflection of the fan cowl 124 may be reduced by converting a bending response of the fan cowl 124 to a membrane tension response via tangential restraints. As such, tangential restraints may be any component that may convert a bending response of the fan cowl 124 to membrane tension. Accordingly, the one or more restraint surfaces may be configured to contact the one or more features (e.g., surfaces) configured to interface with the one or more restraint surfaces when the fan cowl 124 is subjected to bending.

In certain examples, such as that of FIG. 5A, the tangential restraint 132A may include a top portion. The tangential receiving portion 134A may also include a feature configured to interface with the top portion. As such, the top portion may contact the feature configured to interface with the top portion to prevent further deflection of the fan cowl 124.

FIG. 5B may illustrate another example of a tangential restraint 132B with a tangential receiving portion 134B. The tangential restraint 132B may be similar to the tangential restraint 132A of FIG. 5A. However, the tangential restraint 132B may not include the top portion of the tangential restraint 132A. Nonetheless, as the restraint surfaces of the tangential restraint 132B may still transfer bending force experienced by the fan cowl 124 to the fixed nacelle portion and thus convert the bending force to membrane tension. In other examples, the tangential restraint 132B may be another such shape, such as, for example, a triangular shape.

FIG. 5C may illustrate a further example of a tangential restraint 132C with a tangential receiving portion 134C. FIG. 5C may illustrate a convex tangential restraint 132C and a concave tangential receiving portion 134C. The convex tangential restraint 132C may be a half circle, half sphere, and/or another such form. Certain examples of the convex tangential restraint 132C may be configured to not contact the concave tangential receiving portion 134C when the fan cowl 124 is opened and/or closed. Additionally, certain other examples of the tangential restraint 132C may be, for example, a pin and/or another such form.

Deflection of the fan cowl 124 may lead to contact of the tangential restraint 132C with a portion of the tangential receiving portion 134C. For example, the tangential restraint 132C may contact a sidewall or other portion of the tangential receiving portion 134C when, for example, the fan cowl 124 experiences deflection. When the fan cowl 124 deflects, a portion of the tangential restraint 132C may contact the tangential receiving portion 134C and may minimize further deflection of the fan cowl 124 and/or convert bending of the fan cowl 124 to membrane tension.

Figure 6:
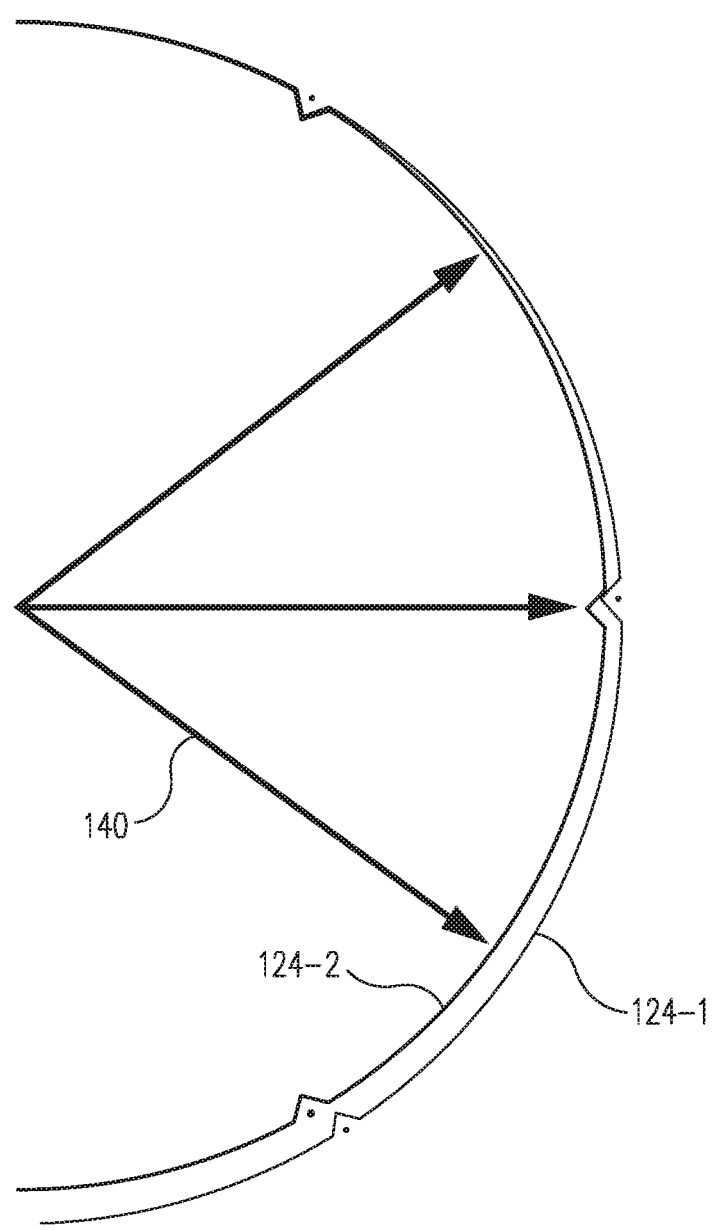
FIG. 6 is an analysis of deflection of a fan cowl with tangential restraints as compared to deflection of a fan cowl without tangential restraints in accordance with an example of the disclosure.

FIG. 6 is an analysis of deflection of a fan cowl with tangential restraints as compared to deflection of a fan cowl without tangential restraints in accordance with an example of the disclosure. FIG. 6 shows a fan cowl 124-1 that may not include tangential restraints and a fan cowl 124-2 that may include three tangential restraints arranged at regular intervals.

FIG. 6 may illustrate a simulation of deflections experienced by each of the fan cowls 124-1 and 124-2 when subjected to a force 140. The force 140 may be applied in a distributed manner around the perimeter of the fan cowls 124-1 and 124-2 as shown in FIG. 6. Each of the fan cowl 124-1 and 124-2 may be subjected to the force 140. As shown in FIG. 6, the deflection of the fan cowl 124-1 (without tangential restraints) subjected to the force 140 is much greater than the deflection of the fan cowl 124-2 (with tangential restraints) subjected to the force 140. In certain examples, due to the greater strength of the fan cowl in membrane tension and the resulting lower deflection, the fan cowl 124-2 may be made from thinner materials than the fan cowl 124-1. Such thinner materials may result in the fan cowl 124-2 being lighter than the fan cowl 124-1 and thus more fuel efficient, while still deflecting less.

Figure 7:
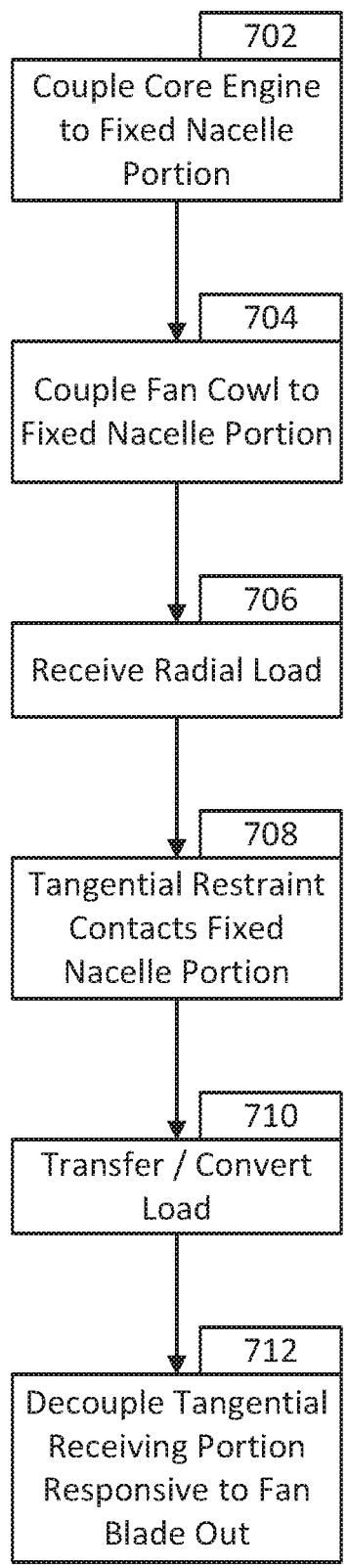
FIG. 7 is a flowchart detailing assembling and use of an aircraft propulsor with tangential restraints in accordance with an example of the disclosure.

FIG. 7 is a flowchart detailing assembling and use of an aircraft propulsor with tangential restraints in accordance with an example of the disclosure. In block 702, the core engine may be coupled to the fixed nacelle portion of the aircraft propulsor. As such, the core engine and the fixed nacelle portion may be assembled together.

In block 704, the fan cowl may be coupled to the fixed nacelle portion. The fan cowl may be coupled by, for example, assembling one or more hinges that allow the fan cowl to move respective to the fixed nacelle portion during use of the aircraft propulsor. Additionally, one or more latches that may secure the fan cowl to the fixed nacelle portion may be coupled to the fan cowl and/or the fixed nacelle portion in block 704. The fan cowl may thus be secured (e.g., via the one or more latches) to the fixed nacelle portion. Additionally, one or more tangential restraints and/or tangential receiving portions may be assembled to the fan cowl and/or the fixed nacelle portion, respectively.

In block 706, the aircraft propulsor may be operated. Operation of the aircraft propulsor may transfer force to the fan cowl that may deflect the fan cowl. A load may be received by the fan cowl in block 706. The load may be from, for example, aerodynamic loads due to airflow passing over the nacelle, forces from operation of the aircraft propulsor, "scooping" effects due to gaps between the fan cowl and the fixed nacelle portion and/or other components of the aircraft propulsor. In certain examples, the load may provide forces that act on the fan cowl to deflect it radially outward.

In block 708, deflection of the fan cowl may cause the tangential restraints to contact the fixed nacelle portion (e.g., the tangential receiving portions of the fixed nacelle portion). In certain other embodiments, the tangential restraints may contact the fixed nacelle portion (e.g., the tangential receiving portions of the fixed nacelle portion) if the fan cowl is shut, even if there is no deflection of the fan cowl due operation of the aircraft propulsor. Such examples may not include block 308.

In block 710, load may be transferred and/or converted. As such, for example, load received by the fan cowl may be transferred to the fixed nacelle portion and/or radial loads received by the fan cowl may be converted to membrane tension. Such transferring and/or conversion of loads may reduce deflection of the fan cowl.

In certain examples, in block 712, the core engine may suffer a fan blade out situation. In such a situation, the fan blade of the core engine may separate from the rest of the core engine. The fan blade may contact the fan cowl. Responsive to the fan blade contacting the fan cowl, the tangential receiving portion and/or the tangential restraints may decouple and allow the fan cowl to further deform, but avoiding catastrophic failure of the aircraft propulsor.

Figure 8:
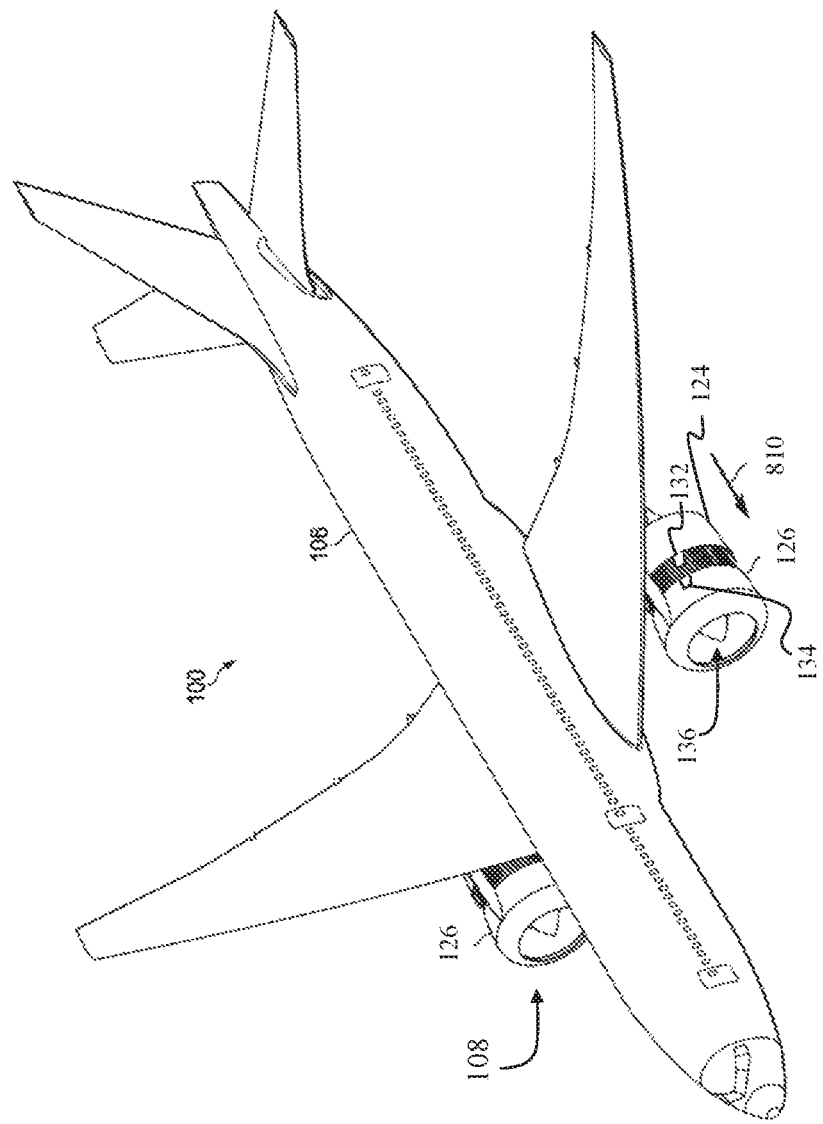
FIG. 8 is a perspective view of an aircraft with thrust reversers in accordance with an example of the disclosure.
Figure 9:
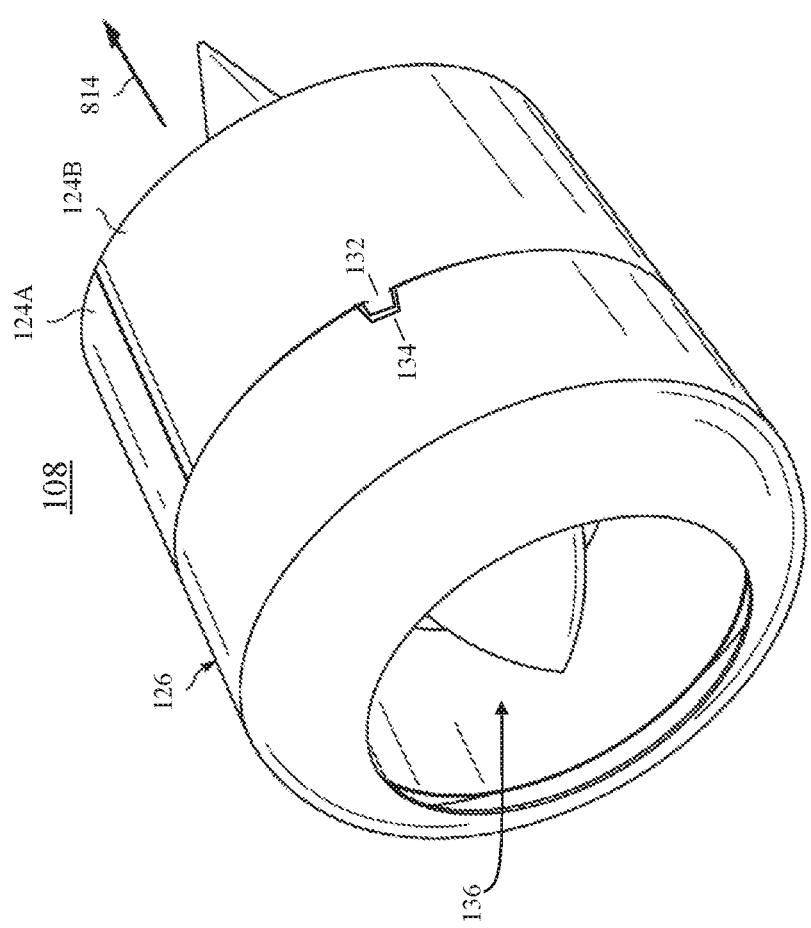
FIG. 9 is a perspective view of a nacelle with a translating sleeve in a forward thrust configuration in accordance with an example of the disclosure.
Figure 10:
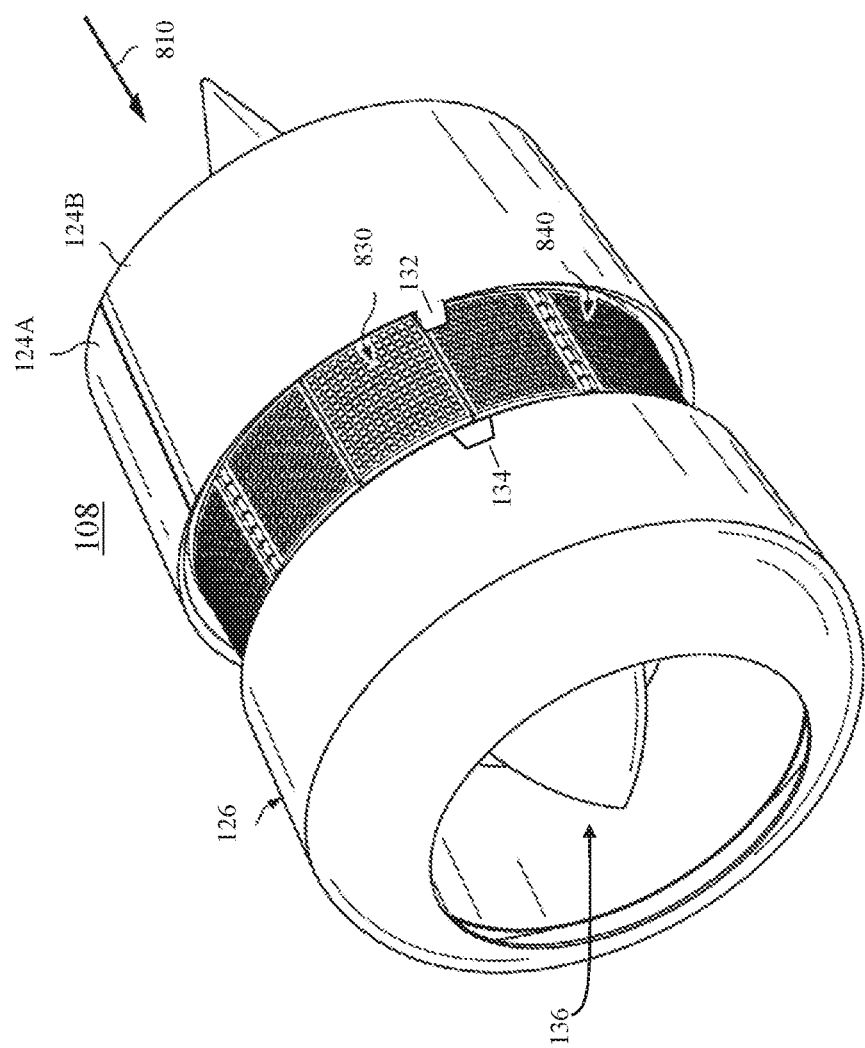
FIG. 10 is a perspective view of a nacelle with a translating sleeve in a reverse thrust configuration in accordance with an example of the disclosure.

The tangential restraints described above, including those shown in FIGS. 5A-5C, can be incorporated into many existing nacelle or fan cowl designs, including those used with thrust reversers. Thrust reversers can quickly reduce the aircraft speed, for example immediately after landing when the aircraft speed, and hence the lifting force, are still high and hence the tire traction is low to make the brakes ineffective to stop the aircraft over a short distance. See for example U.S. Pat. No. 9,482,180, issued Nov. 1, 2016 (inventor: Bol), incorporated herein by reference; U.S. patent publication no. 2014/0116024, published May 1, 2014 (inventor: Channel), incorporated herein by reference; U.S. patent publication no. 2010/0126139, published May 27, 2010 (inventor: Howe), incorporated herein by reference, issued as U.S. Pat. Nos. 8,127,532; 8,528,857, issued Sep. 10, 2013 (inventors: Hillereau et al.), incorporated herein by reference. FIG. 8 is a perspective view of an aircraft 100 with jet propulsors 108 having translating sleeves 124 in reverse thrust configuration; at least some gas flows out of the engine 136 assembly in the forward direction, marked by arrow 810. FIG. 9 is a perspective view of a propulsor 108 in forward thrust configuration, with the air flowing out rearward in the direction of arrow 814. FIG. 10 is a perspective view of a propulsor 108 in reverse thrust configuration. The nacelle includes a translating sleeve 124 (124A, 124B) moving fore and aft along a central axis of engine 136, along arrows 810 and 814, between the forward and reverse thrust configurations; see the aforementioned Bol reference (U.S. Pat. No. 9,482,180). In FIGS. 9 and 10, sleeve 124 consists of two halves 124A, 124B. Translating sleeve 124 can alternatively be a single unitary sleeve, or may consist of any number of pieces.

In forward thrust configuration (FIG. 9), translating sleeve 124 is in stowed position, with its forward end engaging the nacelle's fixed cowling 126.

Figure 11:
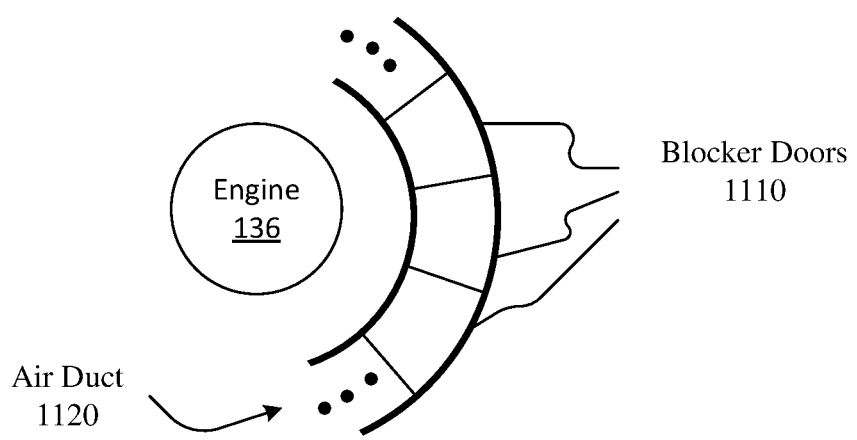
FIG. 11 is a partial rear view of a propulsor with blocker doors in accordance with one example of the disclosure.

When reverse thrust is desired (FIGS. 8, 10), translating sleeve 124 slides rearward, away from the rear edge of fixed cowling 126, to allow gas to flow outward through cascades 830 (FIG. 10). Blocker doors 1110 (FIG. 11) or other blocker structures at least partially block the airflow in the rearward direction, to reduce or eliminate the aft thrust. In some embodiments, engine 136 is a high bypass ratio engine, possibly a turbofan, and the blocker structures only block the bypass air duct 1120. The primary air passage is not blocked, and the exhaust gas flows rearward in both reverse and forward thrust configurations. See the Channel reference for example.

In some embodiments, tangential restraints 132 do not contact the tangential receiving portions 134 unless the translating sleeve 124 is deflected while in the forward thrust configuration, similarly to fan cowl deflection described above in connection with FIGS. 1-7. When the translating sleeve is deflected in forward thrust configuration, tangential restraints 132 contact the tangential receiving portions 134 to convert at least a portion of a radial load received by translating sleeve 124 to membrane tension, as described above for the fan cowl in connection with FIGS. 1-7.

FIG. 10 also shows translating sleeve movement system 840 described in the Bol reference. In some embodiments, the propulsor can be as in the Bol reference, except for the tangential restraints 132 on translating sleeve 124, and except for the corresponding tangential receiving portions 134 on fixed cowling 126.

FIGS. 8-10 show only one pair of a tangential restraint 132 and tangential receiving portion 134, but any number of pairs can be present, and can be arranged along the circumference of the front end of translating sleeve 124 and rear end of inlet cowing 126 at equally spaced angles or intervals or in any other arrangement. The tangential restraints and receiving portions can be provided on each propulsor 108.

Examples described above illustrate but do not limit the invention. It should also be understood that numerous modifications and variations are possible in accordance with the principles of the present invention. Accordingly, the scope of the invention is defined only by the following claims.

What is claimed is:

1. An aircraft propulsor comprising:
   a core engine;
   a nacelle portion circumscribing the core engine and comprising a tangential receiving portion; and
   a translating sleeve configured to move between a forward thrust position proximate to the nacelle portion, and a reverse thrust position farther away from the nacelle portion than the forward thrust position;
   wherein the translating sleeve comprises a tangential restraint configured to enter the tangential receiving portion without contacting the tangential receiving portion as the translating sleeve moves from the reverse thrust position to the forward thrust position.

2. The aircraft propulsor of claim 1, wherein the tangential restraint is configured to decrease deflection of the translating sleeve in the forward thrust position.

3. The aircraft propulsor of claim 1, wherein:
   the tangential receiving portion is one of a plurality of tangential receiving portions that are part of the nacelle portion; and
   the tangential restraint is one of a plurality of tangential restraints that are part of the translating sleeve, each tangential restraint configured to enter the respective tangential receiving portion as the translating sleeve moves from the reverse thrust position to the forward thrust position.

4. The aircraft propulsor of claim 3, wherein the plurality of tangential restraints are configured to decrease deflection of the translating sleeve in the forward thrust position.

5. The aircraft propulsor of claim 1, wherein the tangential restraint comprises a protrusion of the translating sleeve, the protrusion being configured to enter the tangential receiving portion without contacting the tangential receiving portion as the translating sleeve moves from the reverse thrust position to the forward thrust position.

6. The aircraft propulsor of claim 1, further comprising a bypass air duct and one or more blocker doors configured to reduce or eliminate a bypass air flow through the bypass air duct when the translating sleeve is in the reverse thrust position.

7. The aircraft propulsor of claim 6, further comprising cascades covered by the translating sleeve in the forward thrust position but at least partially uncovered by the translating sleeve to allow air flow from the bypass duct to outside of the propulsor in the reverse thrust position.

8. An aircraft comprising the aircraft propulsor of claim 1, the aircraft comprising:
   a fuselage;
   a wing coupled to the fuselage, wherein the aircraft propulsor is coupled to the fuselage and/or the wing.

9. A method of operating the aircraft of claim 8, the method comprising:
   moving the translating sleeve between a forward thrust position proximate to the nacelle portion, and a reverse thrust position farther away from the nacelle portion than the forward thrust position;
   wherein the translating sleeve comprises a tangential restraint which enters the tangential receiving portion as the translating sleeve moves from the reverse thrust position to the forward thrust position.

10. The method of claim 9, further comprising operating the aircraft when the translating sleeve deflects in the forward thrust position while the tangential restraint decreases the deflection of the translating sleeve in the forward thrust position.

11. The method of claim 9, wherein the tangential restraint enters the tangential receiving portion without contacting the tangential receiving portion as the translating sleeve moves from the reverse thrust position to the forward thrust position.

12. The method of claim 9, wherein the tangential restraint comprises a protrusion of the translating sleeve, and the protrusion enters the tangential receiving portion without contacting the tangential receiving portion as the translating sleeve moves from the reverse thrust position to the forward thrust position.

13. The method of claim 9, further aircraft propulsor comprises a bypass air duct and one or more blocker doors that reduce or eliminate a bypass air flow through the bypass air duct when the translating sleeve is in the reverse thrust position.

14. The method of claim 13, wherein the aircraft propulsor comprises cascades covered by the translating sleeve in the forward thrust position but at least partially uncovered by the translating sleeve to allow air flow from the bypass duct to outside of the propulsor in the reverse thrust position.

15. The method of claim 9, wherein:
   the tangential receiving portion is one of a plurality of tangential receiving portions that are part of the nacelle portion; and
   the tangential restraint is one of a plurality of tangential restraints that are part of the translating sleeve, each tangential restraint entering the respective tangential receiving portion as the translating sleeve moves from the reverse thrust position to the forward thrust position.

16. An aircraft propulsor comprising:
a core engine;
a fixed nacelle portion circumscribing the core engine and comprising:
a nacelle latch, and
a tangential receiving portion; and
a fan cowl configured to rotate around at least a first axis between an open position and a closed position, and comprising:
a fan cowl latch configured to couple to the nacelle latch, and
a tangential restraint configured to enter the tangential receiving portion as the fan cowl rotates around the first axis from the open position to the closed position;
wherein the tangential restraint comprises a protrusion of the fan cowl, the protrusion being configured to enter the tangential receiving portion without contacting the tangential receiving portion as the fan cowl rotates around the first axis from the open position to the closed position.

17. The aircraft propulsor of claim 16, wherein the tangential restraint is configured to decrease deflection of the fan cowl by contacting the fixed nacelle portion when the fan cowl is deflected while the fan cowl latch and the nacelle latch are coupled together.

18. The aircraft propulsor of claim 16, wherein the tangential restraint is further configured to transfer at least a portion of a radial load received by the fan cowl to the portion of the fixed nacelle portion by contacting the tangential restraint.

19. The aircraft propulsor of claim 16, wherein:
the tangential receiving portion is one of a plurality of tangential receiving portions that are part of the fixed nacelle portion; and
the tangential restraint is one of a plurality of tangential restraints that are part of the fan cowl, each tangential restraint configured to enter the respective tangential receiving portion as the fan cowl rotates around the first axis from the open position to the closed position;
wherein each tangential restraint comprises a respective protrusion of the fan cowl, the protrusion being configured to enter the respective tangential receiving portion without contacting the respective tangential receiving portion as the fan cowl rotates around the first axis from the open position to the closed position.

20. An aircraft comprising the aircraft propulsor of claim 16, the aircraft comprising:
a fuselage;
a wing coupled to the fuselage, wherein the aircraft propulsor is coupled to the fuselage and/or the wing.

* * * * *